United States Patent
Chen

(10) Patent No.: US 9,729,061 B2
(45) Date of Patent: Aug. 8, 2017

(54) BOOST REGULATOR HAVING ADAPTIVE DEAD TIME

(71) Applicant: QUALCOMM Incorporated, San Diego, CA (US)

(72) Inventor: Jiwei Chen, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/794,777

(22) Filed: Jul. 8, 2015

(65) Prior Publication Data

US 2017/0012526 A1  Jan. 12, 2017

(51) Int. Cl.
G05F 1/00 (2006.01)
H02M 3/158 (2006.01)
H02M 1/38 (2007.01)
H02M 1/00 (2006.01)

(52) U.S. Cl.
CPC .......... *H02M 3/1588* (2013.01); *H02M 1/38* (2013.01); *H02M 2001/0009* (2013.01)

(58) Field of Classification Search
CPC .. H02M 3/158; H02M 3/1582; H02M 3/1588; H02M 2001/0045; H02M 2001/0067
USPC .......................................... 323/271, 282–285
See application file for complete search history.

(56) References Cited

U.S. PATENT DOCUMENTS

| 8,553,430 | B2 | 10/2013 | Melanson et al. |
| 2008/0012545 | A1 | 1/2008 | Komiya |
| 2008/0239774 | A1* | 10/2008 | Canfield ............. H02M 3/1588 363/127 |
| 2012/0105039 | A1 | 5/2012 | Brown |
| 2013/0241503 | A1 | 9/2013 | Galinski, III |
| 2013/0318366 | A1 | 11/2013 | Mao et al. |
| 2014/0253086 | A1* | 9/2014 | Rosu-Hamzescu H03K 17/0822 323/311 |
| 2014/0285170 | A1 | 9/2014 | Deng |
| 2014/0312870 | A1 | 10/2014 | Imayoshi et al. |
| 2014/0347028 | A1 | 11/2014 | Jayaraj et al. |
| 2014/0376275 | A1 | 12/2014 | Ohashi |
| 2015/0069983 | A1 | 3/2015 | Hawawini et al. |
| 2015/0115911 | A1 | 4/2015 | Parto et al. |

FOREIGN PATENT DOCUMENTS

EP  2590307 A2  5/2013

OTHER PUBLICATIONS

Wikipedia, "Booster converter", available at http://en.wikipedia.org/wiki/Boost_converter, Wikipedia, 7 pages, last modified Mar. 7, 2015.
Subbarao Surendra Chakkirala et al, Related U.S. Appl. No. 14/534,034, filed on Nov. 11, 2014.
Written Opinion—PCT/US2016/039391—ISA/EPO—Oct. 31, 2016.
International Search Report—PCT/US2016/039391—ISA/EPO—Oct. 31, 2016.

* cited by examiner

*Primary Examiner* — Adolf Berhane
*Assistant Examiner* — Afework Demisse
(74) *Attorney, Agent, or Firm* — Haynes and Boones, LLP

(57) ABSTRACT

A boost regulator that selectively operates in an asynchronous mode, a synchronous mode, or an adaptive mode. In the adaptive mode, the boost mode regulator controls a high side switch according to an adaptive dead time. Adaptive mode allows the boost regulator to operate more efficiently than in asynchronous mode.

28 Claims, 8 Drawing Sheets

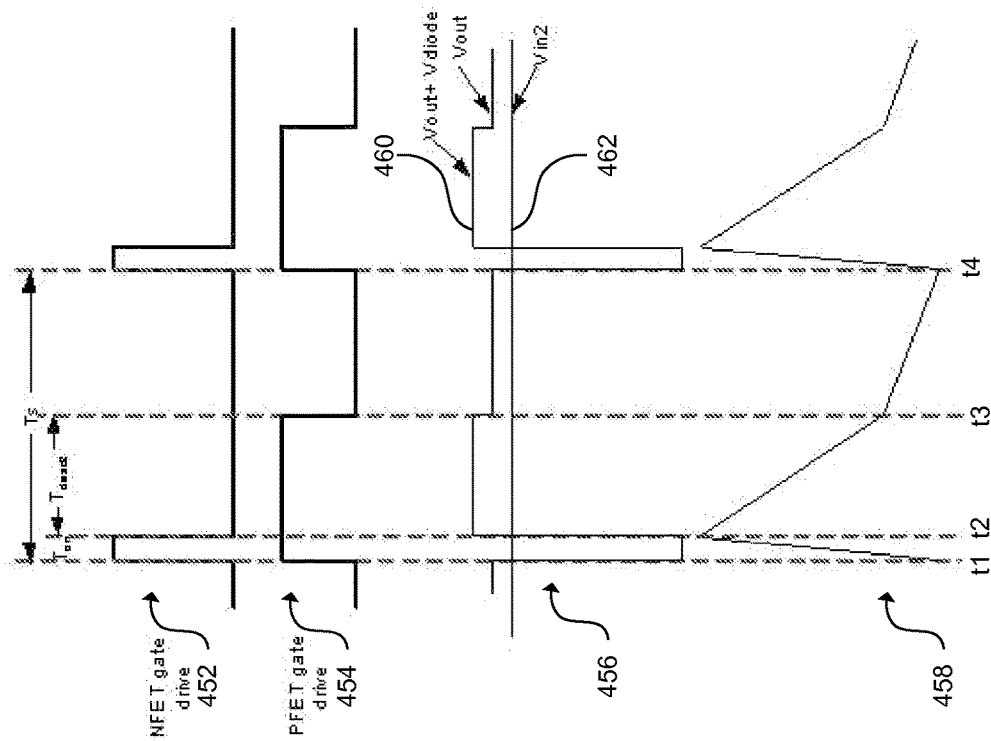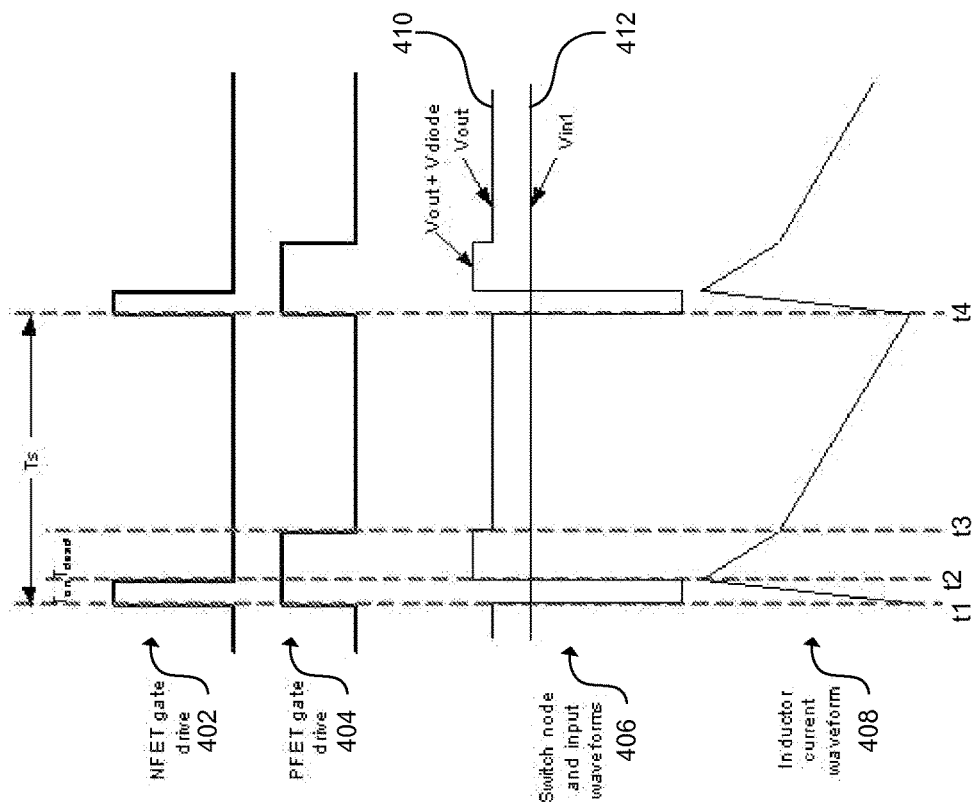

BOOST REGULATOR HAVING ADAPTIVE DEAD TIME

CROSS-REFERENCE TO RELATED APPLICATIONS

Not applicable.

BACKGROUND

The disclosure relates to boost regulators, and in particular, to operating a boost regulator in various operational modes.

Unless otherwise indicated herein, the approaches described in this section are not admitted to be prior art by inclusion in this section.

A boost regulator is a DC-to-DC (direct current) power converter with an output voltage greater than its input voltage. A boost regulator may also be called a boost converter or a (voltage) step-up converter. A boost regulator is a class of switched-mode power supply (SMPS) containing at least two semiconductor elements (e.g., a diode and a transistor) and at least one energy storage element (e.g., a capacitor, inductor, or the two in combination). Filters made of capacitors (sometimes in combination with inductors) may be added to the output of the boost regulator to reduce output voltage ripple.

Power for the boost regulator can come from any suitable DC sources, such as batteries, solar panels, rectifiers and DC generators. A process that changes one DC voltage to a different DC voltage is called DC to DC conversion. A boost regulator is sometimes called a step-up converter since it "steps up" the source voltage. Since power (P=V*I) must be conserved, the output current is lower than the input current.

SUMMARY

The present disclosure is directed to improving the efficiency of the operation of boost converters.

In one embodiment, a boost regulator includes a low side switch, a high side switch, and a boost mode regulator. The low side switch is coupled to a switching node, and the high side switch is coupled to the switching node and to an output node. The boost mode regulator controls the low side switch and the high side switch to selectively operate in one of an asynchronous mode, a synchronous mode, and an adaptive mode.

According to a further embodiment, the boost mode regulator switches the low side switch according to a duty cycle. The duty cycle is adjustable, and the boost mode regulator increases the duty cycle to increase an output voltage at the output node.

According to a further embodiment, in the synchronous mode, the boost mode regulator controls the low side switch and the high side switch to operate such that the high side switch conducts when the low side switch does not conduct, and the high side switch does not conduct when the low side switch conducts.

According to a further embodiment, in the asynchronous mode, the boost mode regulator controls the high side switch to not conduct, and the boost mode regulator switches the low side switch according to a duty cycle.

According to a further embodiment, the boost regulator has an input voltage and an output voltage. In the adaptive mode, the boost mode regulator controls the high side switch according to an adaptive dead time. The adaptive dead time changes as a voltage difference between the input voltage and the output voltage changes. In the adaptive mode, when the low side switch switches from conducting to not conducting, the boost mode regulator controls the high side switch to switch from not conducting to conducting after the adaptive dead time. In the adaptive mode, when the low side switch switches from not conducting to conducting, the boost mode regulator controls the high side switch to switch from conducting to not conducting after the adaptive dead time.

According to a further embodiment, the boost regulator includes an inductor coupled to the switching node and to an input node. According to a further embodiment, the boost regulator includes a battery coupled to the input node. According to a further embodiment, the output node has an output voltage, the high side switch has a diode drop voltage when the high side switch is not conducting, and the output voltage corresponds to a switching voltage at the switching node less the diode drop voltage when the high side switch is not conducting.

According to a further embodiment, the boost regulator is coupled to an input node, and the boost regulator further comprises an analog timer and an adaptive dead time generator circuit. The analog timer generates a comparison signal based on an input voltage at the input node and an output voltage at the output node. The adaptive dead time generator circuit receives the comparison signal and generates a control signal to control the high side switch. The control signal includes an adaptive dead time according to the comparison signal.

According to a further embodiment, when a voltage difference between an input voltage and an output voltage of the boost regulator is below a threshold, the boost regulator controls the low side switch and the high side switch to operate in the asynchronous mode.

According to a further embodiment, when a voltage difference between an input voltage and an output voltage of the boost regulator is above a threshold, the boost regulator controls the low side switch and the high side switch to operate in the synchronous mode.

According to a further embodiment, when a voltage difference between an input voltage and an output voltage of the boost regulator is between a first threshold and a second threshold, the boost regulator controls the low side switch and the high side switch to operate in the adaptive mode.

In another embodiment, a method of operating a boost regulator includes detecting a voltage difference between an input voltage and an output voltage of the boost regulator. The method further includes when the voltage difference is below a first threshold, operating the boost regulator in an asynchronous mode. The method further includes when the voltage difference is above a second threshold, operating the boost regulator in a synchronous mode. The method further includes when the voltage difference is between the first threshold and the second threshold, operating the boost regulator in an adaptive mode.

According to a further embodiment, the method includes controlling a low side switch and a high side switch of the boost regulator to selectively operate in the asynchronous mode, the synchronous mode, and the adaptive mode.

According to a further embodiment, the method includes switching a low side switch of the boost regulator according to a duty cycle. The duty cycle is adjustable, and the boost regulator increases the duty cycle to increase the output voltage.

According to a further embodiment, operating the boost regulator in the synchronous mode comprises controlling a low side switch and a high side switch to operate such that the high side switch conducts when the low side switch does not conduct, and the high side switch does not conduct when the low side switch conducts.

According to a further embodiment, operating the boost regulator in the asynchronous mode comprises controlling a high side switch to not conduct, and switching a low side switch according to a duty cycle.

According to a further embodiment, operating the boost regulator in the adaptive mode comprises determining an adaptive dead time based on the voltage difference. The adaptive dead time changes as the voltage difference changes. When a low side switch switches from conducting to not conducting, operating the boost regulator in the adaptive mode further comprises controlling a high side switch to switch from not conducting to conducting after the adaptive dead time. When the low side switch switches from not conducting to conducting, operating the boost regulator in the adaptive mode further comprises controlling the high side switch to switch from conducting to not conducting after the adaptive dead time.

In another embodiment, a boost regulator includes means for detecting a voltage difference between an input voltage and an output voltage of the boost regulator, and means for selectively operating the boost regulator in one of an asynchronous mode, a synchronous mode, and an adaptive mode, according to the voltage difference.

According to a further embodiment, in the synchronous mode, the means for selectively operating the boost regulator controls a low side switch and a high side switch to operate such that the high side switch conducts when the low side switch does not conduct, and the high side switch does not conduct when the low side switch conducts.

According to a further embodiment, in the asynchronous mode, the means for selectively operating the boost regulator controls a high side switch to not conduct, and the means for selectively operating the boost regulator switches a low side switch according to a duty cycle.

According to a further embodiment, in the adaptive mode, the means for selectively operating the boost regulator determines an adaptive dead time based on the voltage difference. The adaptive dead time changes as the voltage difference changes. When a low side switch switches from conducting to not conducting, the means for selectively operating the boost regulator controls a high side switch to switch from not conducting to conducting after the adaptive dead time. When the low side switch switches from not conducting to conducting, the means for selectively operating the boost regulator controls the high side switch to switch from conducting to not conducting after the adaptive dead time.

In another embodiment, an electronic device includes a battery, an inductor, a load and a boost regulator. The battery is coupled to an input node, the inductor is coupled to the input node and to a switching node, and the load is coupled to an output node. The boost regulator includes a low side switch coupled to the switching node, a high side switch coupled to the switching node and to the output node, and a boost mode regulator that controls the low side switch and the high side switch to selectively operate in one of an asynchronous mode, a synchronous mode, and an adaptive mode.

According to a further embodiment, the boost regulator begins in the asynchronous mode, transitions to the adaptive mode when a voltage of the battery falls below a first threshold, and transitions to the synchronous mode when the voltage of the battery falls below a second threshold.

According to a further embodiment, the boost regulator begins in the synchronous mode, transitions to the adaptive mode when a voltage of the battery rises above a first threshold, and transitions to the asynchronous mode when the voltage of the battery rises above a second threshold.

According to a further embodiment, the boost regulator begins in the asynchronous mode, transitions to the adaptive mode when a voltage of the load rises above a first threshold, and transitions to the synchronous mode when the voltage of the load rises above a second threshold.

According to a further embodiment, the boost regulator begins in the synchronous mode, transitions to the adaptive mode when a voltage of the load falls below a first threshold, and transitions to the asynchronous mode when the voltage of the load falls below a second threshold.

According to a further embodiment, in the adaptive mode, the boost mode regulator controls the high side switch according to an adaptive dead time. The adaptive dead time decreases as a voltage of the battery decreases. The adaptive dead time increases as a voltage of the battery increases.

According to a further embodiment, the battery has a battery voltage and the load has a load voltage. In the adaptive mode, the boost mode regulator controls the high side switch according to an adaptive dead time. The adaptive dead time changes as a voltage difference between the battery voltage and the load voltage changes. In the adaptive mode, when the low side switch switches from conducting to not conducting, the boost mode regulator controls the high side switch to switch from not conducting to conducting after the adaptive dead time. In the adaptive mode, when the low side switch switches from not conducting to conducting, the boost mode regulator controls the high side switch to switch from conducting to not conducting after the adaptive dead time.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings:

FIG. 4A and FIG. 4B are graphs that illustrate the different dead times that result from different input voltages Vin, within the adaptive mode.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The present disclosure uses the terms "conducting" and "not conducting", with reference to a switch (such as a transistor). A synonymous term for conducting is "on", and a synonymous term for not conducting is "off". An n-channel metal oxide semiconductor (NMOS) device is on when its gate is high, and is off when its gate is low. A p-channel MOS (PMOS) device is on when its gate is low, and is off when its gate is high. An example of an NMOS device is an n-channel field effect transistor (NFET), and an example of a PMOS device is a p-channel field effect transistor (PFET).

The present disclosure uses the terms "synchronous mode", "asynchronous mode" and "adaptive mode". In brief, these terms relate to the relationships between the low side switch and the high side switch in the boost regulator. These terms are defined and described in more detail in subsequent sections. However, these terms differ from, and are not to be considered the same as, the term "continuous mode" and the term "discontinuous mode". In continuous mode, the current through the inductor in the boost regulator never falls to zero. In discontinuous mode, the inductor may be completely discharged before the end of a whole commutation cycle, and the current through the inductor falls to zero during part of the period. Thus, continuous mode and discontinuous mode relate to the relationship between the current and the inductor, not to the relationships between the low side switch and the high side switch.

Figure 1:
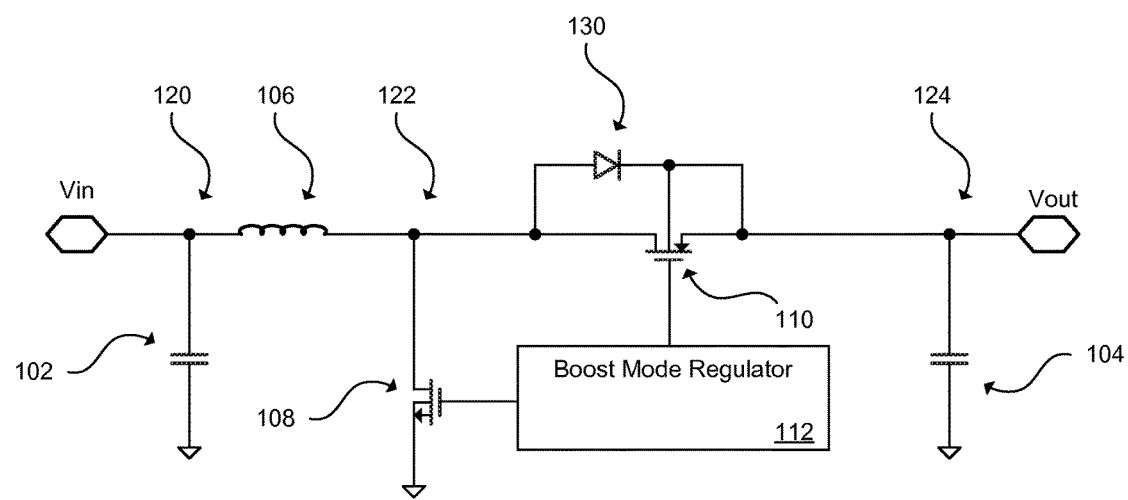
FIG. 1 is a diagram of a boost regulator 100.

FIG. 1 is a diagram of a boost regulator 100. The boost regulator 100 includes an input capacitor 102, an output capacitor 104, an inductor 106, a low side switch 108, a high side switch 110, and a boost mode regulator 112. An input node 120, a switching node 122, and an output node 124 are also shown. The input node 120 connects to a source (e.g., a battery) having an input voltage Vin, and the output node 124 connects to a load having an output voltage Vout.

The input capacitor 102 reduces ripple of the input voltage Vin at the input node 120, and the output capacitor 104 reduces ripple of the output voltage Vout at the output node 124.

The low side switch 108 may be an NMOS transistor, and the high side switch 110 may be a PMOS transistor. As an alternative, the low side switch 108 may be a PMOS transistor. As another alternative, the high side switch 110 may be an NMOS transistor. The low side switch 108 and the high side switch 110 may also be made using other types of transistors or circuit structures.

The high side switch 110 includes a diode structure 130. The diode structure 130 may be a body diode of the high side switch 110, or may be a diode in parallel with the high side switch 110. The diode structure 130 allows current to flow from the switching node 122 to the output node 124 when the high side switch 110 is off. The diode structure 130 has a diode drop voltage (e.g., 0.6 V), so the output voltage Vout at the output node 124 will be slightly less than the voltage at the switching node 122. Thus, the diode drop voltage allows the input voltage Vin (e.g., the battery voltage) at the input node 120 to be higher than the output voltage Vout at the output node 124 (e.g., the load voltage).

The inductor 106, the low side switch 108, and the high side switch 110 operate together to perform the boost. The inductor 106 resists changes in current by creating and destroying a magnetic field. When the low side switch 108 is closed, current flows through the inductor 106 from the input node 120 to the switching node 122, and the inductor 106 stores some energy by generating a magnetic field. The polarity of the left side of the inductor 106 is positive. When the low side switch 108 is opened, current will be reduced as the impedance is higher. The magnetic field previously created will be destroyed to maintain the current flow from the switching node 122 to the output node 124. Thus the polarity will be reversed (e.g., the left side of the inductor 106 will be negative now). As a result, two sources will be in series (e.g., the battery and the inductor 106), causing a higher voltage to charge the output capacitor 104 through the high side switch 110.

In general, the boost regulator 100 boosts the voltage of the source to a desired level for the operation of the load. Note that the boost regulator 100 operates dynamically (adaptively, responsively, etc.). For example, the source voltage (input voltage Vin) may decrease over time due to the battery becoming discharged. The source voltage may increase over time due to the battery being recharged. The load (output voltage Vout) may increase, or decrease, as various components of the load are switched on or off. For example, the load of a mobile telephone may vary according to whether the screen is on or off, the cellular radio is on or off, the wireless radio is on or off, etc. The boost regulator 100 operates to boost the voltage as appropriate for all these conditions as they occur over time. The boost mode regulator 112 generally controls the operation of the boost regulator 100, by controlling the low side switch 108 and the high side switch 110.

The boost regulator 100 operates in one of three modes, depending on how much boost is needed (e.g., the difference between the output voltage Vout and the input voltage Vin). The three modes are the synchronous mode, the asynchronous mode, and the adaptive mode.

Synchronous Mode

Synchronous mode is used when more boost is needed (e.g., when the battery is not fully charged). In synchronous mode, the low side switch 108 and the high side switch 110 operate in synchrony, such that the high side switch 110 conducts when the low side switch 108 does not conduct, and the high side switch 110 does not conduct when the low side switch 108 conducts.

The amount of boost provided is determined by the duty cycle of the low side switch 108. The duty cycle represents the fraction of the commutation period during which the low side switch 108 is on. Therefore D ranges between 0 (the low side switch 108 is never on) and 1 (the low side switch 108 is always on). During the off-state, the low side switch 108 is open, so the current from the inductor 106 flows from the switching node 122 to the output node 124 (to the load). The equation for the duty cycle is as follows:

$$D = 1 - \frac{Vin}{Vout}$$

The above equation shows that the output voltage Vout is always higher than the input voltage Vin (as the duty cycle goes from 0 to 1), and that it increases with D, theoretically to infinity as D approaches 1. (Note that this analysis does not account for the diode drop of the high side switch 110, and does not account for the physical constraints of actual circuits.) This is why the boost regulator 100 is sometimes referred to as a step-up converter.

In general, the boost mode regulator 112 switches the low side switch 108 and the high side switch 110 according to the duty cycle. The duty cycle is adjustable, and the boost mode regulator 112 increases the duty cycle to increase the output voltage Vout at the output node 124. The boost regulator 100 may be used in devices where a battery provides the input voltage Vin. As the battery loses charge and the input voltage Vin drops, more boost is needed, so the boost mode regulator 112 increases the duty cycle.

Asynchronous Mode

Asynchronous mode is used when less boost (or no boost) is needed (e.g., when the battery is fully charged). In the asynchronous mode, the boost mode regulator 112 controls the high side switch 110 to not conduct (e.g., fixed off), and the boost mode regulator 112 switches the low side switch 108 according to the duty cycle. As discussed above, the duty cycle is adjustable according to the amount of boost desired. In general, in asynchronous mode, the duty cycle will be low, since less boost (or no boost) is needed. The duty cycle being low means the low side switch 108 is conducting only a small minority of the time, since less boost is needed.

In asynchronous mode (e.g., at higher battery input voltage levels), the low side switch 108 is initially turned on, and current through the inductor 106 increases (ramps up). When the low side switch 108 is turned off, it is desirable to have the current ramp back down to some nominal value. In many applications, when the battery is fully charged and at a peak input voltage Vin, there will be very little voltage drop between Vin and the output voltage Vout (i.e., voltage boosting is mostly required as the battery voltage drops). Thus, the forward voltage drop on the diode structure 130 may be used to increase the voltage on the switching node 122 so that the current can ramp back down when the low side switch 108 is turned off. However, the forward voltage drop on the diode structure 130 decreases the efficiency by up to approximately 10-15%. The adaptive mode, discussed below, is directed to improving this efficiency.

Adaptive Mode

Adaptive mode is used when less boost is needed than in synchronous mode, but more boost is needed than in asynchronous mode. That is, adaptive mode is between synchronous mode and asynchronous mode. In the adaptive mode, the boost mode regulator 112 controls the high side switch 110 according to an adaptive dead time. The adaptive dead time changes (adapts, adjusts, responds, is dynamic, etc.) as the voltage difference between the input voltage and the output voltage changes. When the low side switch 108 switches from conducting to not conducting, the boost mode regulator 112 controls the high side switch 110 to switch from not conducting to conducting after the adaptive dead time. When the low side switch 108 switches from not conducting to conducting, the boost mode regulator 112 controls the high side switch 110 to switch from conducting to not conducting after the adaptive dead time.

As discussed above, the boost mode regulator 112 controls the low side switch 108 to switch according to the duty cycle. As discussed above, the duty cycle is adjustable (responsive, adaptive, dynamic, changeable, etc.) according to the amount of boost desired. In general, in adaptive mode, the duty cycle will be low, similar to asynchronous mode.

Figure 2:
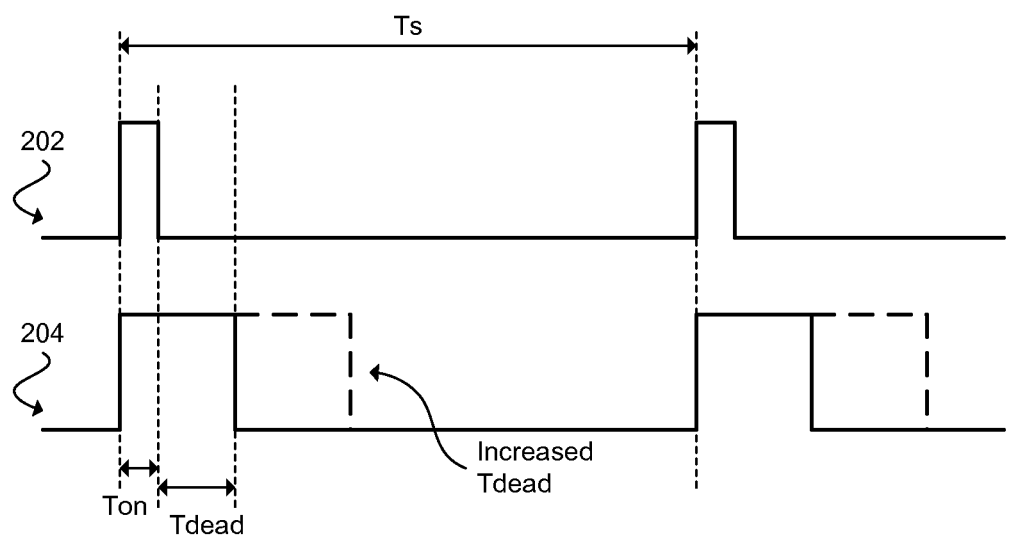
FIG. 2 is a diagram showing the adaptive dead time, in the adaptive mode.

FIG. 2 is a diagram showing the adaptive dead time, in the adaptive mode. The signal 202 is the gate control signal for the low side switch 108 (see FIG. 1), and the signal 204 is the gate control signal for the high side switch 110. The signal 202 corresponds to the gate control signal for an NMOS device, so the high state corresponds to on (conducting) and the low state corresponds to off (not conducting). The signal 204 corresponds to the gate control signal for a PMOS device, so the high state corresponds to off (not conducting) and the low state corresponds to on (conducting).

The period Ts is the commutation period, the period Ton is the time the low side switch 108 (see FIG. 1) is on, and the period Tdead is the dead time. Thus, the high side switch 110 is off for the period Ton plus the dead time Tdead. The duty cycle is then the ratio of Ton to Ts. The dead time Tdead is referred to as an adaptive dead time because the boost mode regulator 112 adjusts it according to changes in Vin (or more precisely, according to changes in the difference between Vout and Vin). For example, the dotted line for the signal 204 shows that the dead time is increased, in response to Vin being increased.

As mentioned above, the boost regulator 100 (see FIG. 1) uses the adaptive dead time Tdead to control the high side switch 110. As can be seen in FIG. 2, the dead time Tdead is the time the high side switch 110 remains non-conducting (signal 204) after the low-side switch 108 switches to non-conducting (signal 202), to provide a diode voltage above Vout so the current through the inductor 106 ramps down. As the battery loses charge, Vin decreases, and the boost regulator 100 operates in adaptive mode, where the high side switch 110 remains off for a minimum time to allow the current through the inductor 106 to ramp down. As Vin continues to decrease, the time that the diode voltage is needed also decreases. Thus, as Vin decreases, the dead time Tdead also decreases. (Or more generally, as the difference between Vout and Vin increases, the dead time Tdead decreases.)

Consider the following example of the modes of operation of the boost regulator 100 (see FIG. 1). Initially there is little (or no) difference between Vout and Vin, so no boost is required, and the boost regulator 100 operates in asynchronous mode. (In fact, the boost regulator 100 may make use of the diode drop of the diode structure 130 when operating in asynchronous mode, due to the battery having a higher voltage (Vin) than the load (Vout).) For example, when the battery is fully charged, the boost regulator 100 operates in asynchronous mode (e.g., the high-side switch 110 is fixed as non-conducting), where the diode structure 130 is kept in the circuit during an entire cycle (because the diode voltage is needed for the full cycle to reduce the current through the inductor 106). As the battery voltage Vin decreases, the voltage difference between Vin and Vout increases. When the voltage difference increases above a first threshold, the boost regulator 100 transitions from the asynchronous mode to the adaptive mode. When first entering the adaptive mode from the asynchronous mode, the dead time Tdead starts at its maximum, then adaptively decreases as the voltage difference continues to increase. In the adaptive mode, the diode voltage is only in the circuit for the time necessary to cause the current through the inductor 106 to ramp down, but is out of the circuit as soon as possible to improve efficiency. When the voltage difference increases above a second threshold, the dead time Tdead on each switching cycle reaches zero, and the boost regulator 100 transitions to synchronous mode.

As a variation on the above example, consider that the boost regulator 100 (see FIG. 1) may start in synchronous mode (according to the voltage difference between Vin and Vout), for example due to the battery not being fully charged. Next, the battery is connected to a charging device, so the charge in the battery begins to increase, and the voltage difference between Vin and Vout begins to decrease. After the voltage difference decreases below a first threshold, the boost regulator 100 transitions from synchronous mode to adaptive mode. Initially the dead time Tdead is at its minimum, but as the charge in the battery continues to increase (and the voltage difference continues to decrease), the dead time Tdead adaptively increases. After the voltage difference decreases below a second threshold, the boost regulator 100 transitions from adaptive mode to asynchronous mode.

Figure 3:
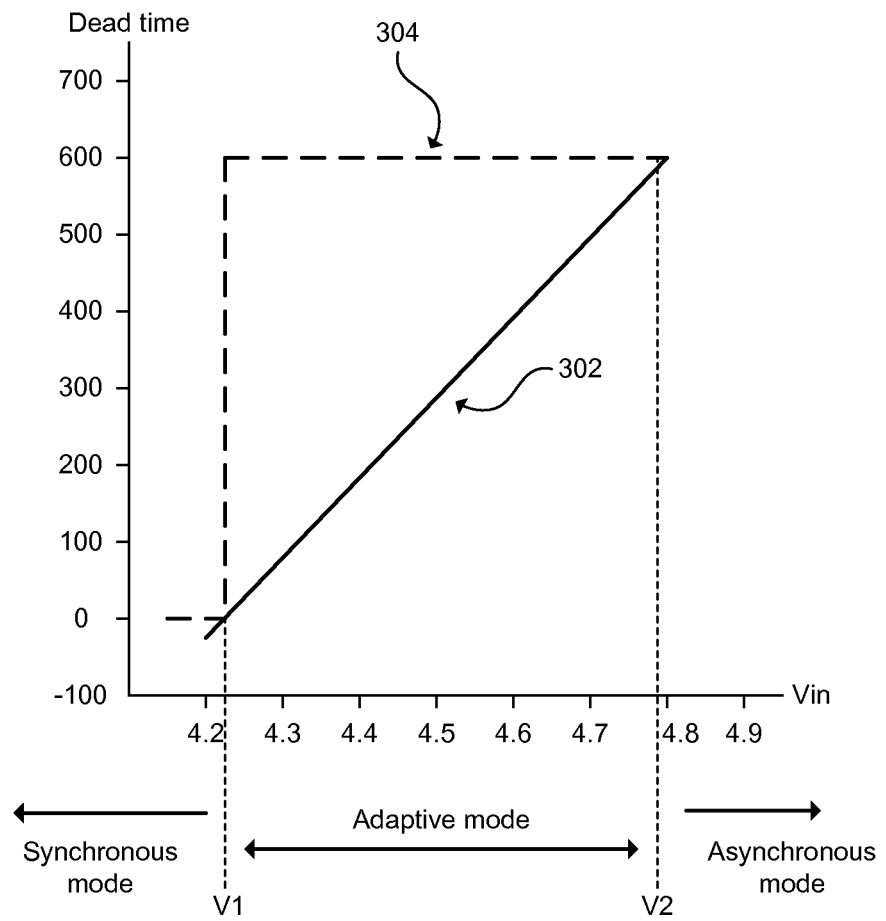
FIG. 3 is a graph showing an example of the adaptive dead time.

FIG. 3 is a graph showing an example of the adaptive dead time. In this example, the output voltage Vout is fixed at 4.6 V, the diode voltage is 0.6 V, and the switching frequency is 1.6 MHz. The x-axis is the input voltage Vin, and the y-axis is the duration of the dead time in ns. The line 302 shows the dead time as it changes with (adapts to) the changing input voltage Vin. As discussed above regarding FIG. 1, the dead time is used to control the high side switch 110. Note the two thresholds V1 and V2. When the input voltage Vin is above V2 (about 4.79 V), the boost regulator 100 operates in asynchronous mode, and the high side switch 110 is not conducting. When the input voltage Vin is below V1 (about 4.22 V), the boost regulator 100 operates in synchronous mode; the high side switch 110 is conducting when the low side switch 108 is not conducting, and the high side switch 110 is not conducting when the low side switch 108 is conducting. When the input voltage Vin is between V1 and V2, the boost regulator 100 operates in adaptive mode. Nearer to V2, the dead time is higher (e.g., 600 ns); as the input voltage Vin decreases toward V1, the dead time decreases. Similarly, as the input voltage Vin increases from V1 toward V2, the dead time increases.

The line 304 shows how the control signal for the high side switch 110 (see FIG. 1) would be modified in the absence of the adaptive dead time (e.g., in the absence of adaptive mode, with only synchronous and asynchronous modes available). When the input voltage Vin is above V2, the boost regulator operates in asynchronous mode, and the high side switch 110 is not conducting. As the input voltage Vin decreases from V2 to V1, the high side switch 110 is still fixed as not conducting. That is, in the absence of adaptive mode, the boost regulator would use asynchronous mode between V1 and V2. Then as the input voltage Vin decreases below V1, the boost regulator operates in synchronous mode. As described above, the diode structure 130 (see FIG. 1) is in the circuit when the high side switch 110 is not conducting, so between V1 and V2, the line 304 puts the diode structure 130 into the circuit more often than the line 302, so a boost regulator lacking the adaptive mode is less efficient.

The example of FIG. 3 can be generalized to describe a voltage difference between the output voltage Vout and the input voltage Vin (as opposed to the fixed output voltage Vout described above). The output voltage Vout may change as the load changes, for example, as various components of the load are turned on or off (e.g., screen, cellular radio, wireless radio, etc.). When the voltage difference is below a first threshold, the boost regulator controls the low side switch 108 and the high side switch 110 to operate in the asynchronous mode. (As compared to FIG. 3, the voltage difference is small when the input voltage Vin is large, e.g., when Vin is above V2.) When the voltage difference is above a second threshold, the boost regulator controls the low side switch 108 and the high side switch 110 to operate in the synchronous mode. (As compared to FIG. 3, the voltage difference is large when the input voltage Vin is small, e.g., when Vin is below V1.) When the voltage difference is between the first threshold and the second threshold, the boost regulator controls the low side switch 108 and the high side switch 110 to operate in the adaptive mode. (As compared to FIG. 3, the voltage difference is between the thresholds when the input voltage Vin is between V1 and V2.)

FIG. 4A and FIG. 4B are graphs that illustrate the different dead times that result from different input voltages Vin, within the adaptive mode. In FIG. 4B the input voltage Vin2 (462) is a bit higher than the input voltage Vin1 (412) of FIG. 4A, and correspondingly the dead time Tdead2 of FIG. 4B is longer than the dead time Tdead1 of FIG. 4A.

FIG. 4A shows four waveforms: the low side switch (NFET) control signal 402, the high side (PFET) switch control signal 404, the switching node and input waveforms 406, and the inductor current waveform 408. The dotted lines show times t1, t2, t3 and t4 on the x-axes.

The low side switch control signal 402 controls the low side switch (e.g., 108 in FIG. 1). The low side switch control signal 402 has a commutation period Ts (0 to t4). The low side switch control signal 402 is high for the time period Ton (0 to t2), which corresponds to the low side switch being on (conducting). The low side switch is off (not conducting) the remainder of the commutation period Ts (t2 to t4).

The high side switch control signal 404 controls the high side switch (e.g., 110 in FIG. 1). The high side switch control signal 404 is high for the time period Ton plus the dead time Tdead1 (t1 to t3), which corresponds to the high side switch being off (not conducting). The high side switch is on (conducting) for the remainder of the commutation period Ts (t3 to t4).

The switching node and input waveforms 406 include the switching node waveform 410 and the input voltage Vin waveform 412. The switching node waveform 410 corresponds to the voltage at the switching node 122 (see FIG. 1), and the input voltage Vin waveform 412 corresponds to the voltage at the input node 120 (see FIG. 1). The input voltage Vin waveform 412 is shown staying at a constant level (and the output voltage Vout is also assumed to be unchanging), resulting in the selected dead time Tdead1 as shown. Prior to t1, the switching node waveform 410 is at the output voltage Vout due to the high side switch control signal 404 being low (e.g., the high side switch 110 in FIG. 1 is conducting). At t1, the switching node waveform 410 goes to zero due to the low side switch control signal 402 being high (e.g., the low side switch 108 in FIG. 1 is conducting). At t2, the switching node waveform 410 goes to the output voltage Vout plus the diode drop voltage Vdiode, due to the low side switch control signal 402 being low and the high side switch control signal 404 being high. At t3, the switching node waveform 410 goes to the output voltage Vout due to the low side switch control signal 402 being low and the high side switch control signal 404 being low. At t4, the switching node waveform 410 goes to zero, as discussed above for t1.

The inductor current waveform 408 shows the current through the inductor (e.g., 106 in FIG. 1). At t1, the inductor current waveform 408 starts at its minimum due to the low side switch control signal 402 being low prior to t1. From t1 to t2, the inductor current waveform 408 increases due to the low side switch control signal 402 being high. From t2 to t3, the inductor current waveform 408 decreases at a first rate, due to the low side switch control signal 402 being low and the high side switch control signal 404 being high (due to the dead time Tdead1). From t3 to t4, the inductor current waveform 408 decreases at a second rate, due to the low side switch control signal 402 being low and the high side switch control signal 404 being low. Note that the first rate is greater than the second rate due to the diode structure 130 (see FIG. 1) being in the circuit during the dead time Tdead1. At t4, the inductor current waveform 408 is again at its minimum, as discussed above for t1.

FIG. 4B shows four waveforms: the low side switch control signal 452, the high side switch control signal 454, the switching node and input waveforms 456, and the inductor current waveform 458. These waveforms are similar to those in FIG. 4A, as are the times t1, t2, t3 and t4 on the x-axes. The main difference is that in FIG. 4B the input voltage Vin2 (the waveform 462) is a bit higher than the input voltage Vin1 of FIG. 4A (the waveform 412), and correspondingly the dead time Tdead2 (t2 to t3) of FIG. 4B is longer than the dead time Tdead1 (t2 to t3) of FIG. 4A.

An additional difference concerns the high side switch control signal 454. Since the dead time Tdead2 of FIG. 4B is longer than the dead time Tdead1 of FIG. 4A, the high side switch control signal 454 is high for longer in FIG. 4B as compared to FIG. 4A. This increases the distance between t2 and t3 in FIG. 4B as compared to FIG. 4A.

Another difference concerns the switching node and input waveforms 456. The switching node waveform 450 stays at the output voltage Vout plus the diode drop voltage Vdiode for longer as compared to FIG. 4A. This causes the inductor current waveform 458 to decrease at the first rate (t2 to t3) for longer as compared to FIG. 4A, and to decrease at the second rate (t3 to t4) for shorter as compared to FIG. 4A.

Figure 5:
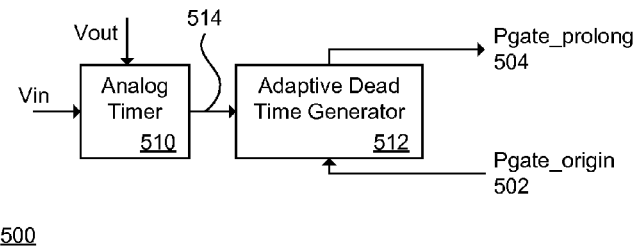
FIG. 5 is a block diagram of a control signal generator 500 for the high side switch 110 (see FIG. 1).

FIG. 5 is a block diagram of a control signal generator 500 for the high side switch 110 (see FIG. 1). The control signal generator 500 may be a component of, or otherwise connect with, the boost mode regulator 112 (see FIG. 1). The control signal generator 500 receives the output voltage signal Vout from the output node 124 (see FIG. 1), the input voltage signal Vin from the input node 120, and an input control signal 502 (Pgate_origin). The control signal generator 500 generates an output control signal 504 (Pgate_prolong) that controls the high side switch 110 (see FIG. 1). In general, the output control signal 504 corresponds to the input control signal 502 plus the dead time Tdead.

The control signal generator 500 includes an analog timer 510 and an adaptive dead time generator 512. The analog timer 510 generates a comparison signal 514 based on the input voltage Vin and the output voltage Vout. The adaptive dead time generator 512 receives the comparison signal 514 and generates the output control signal 504.

Figure 6:
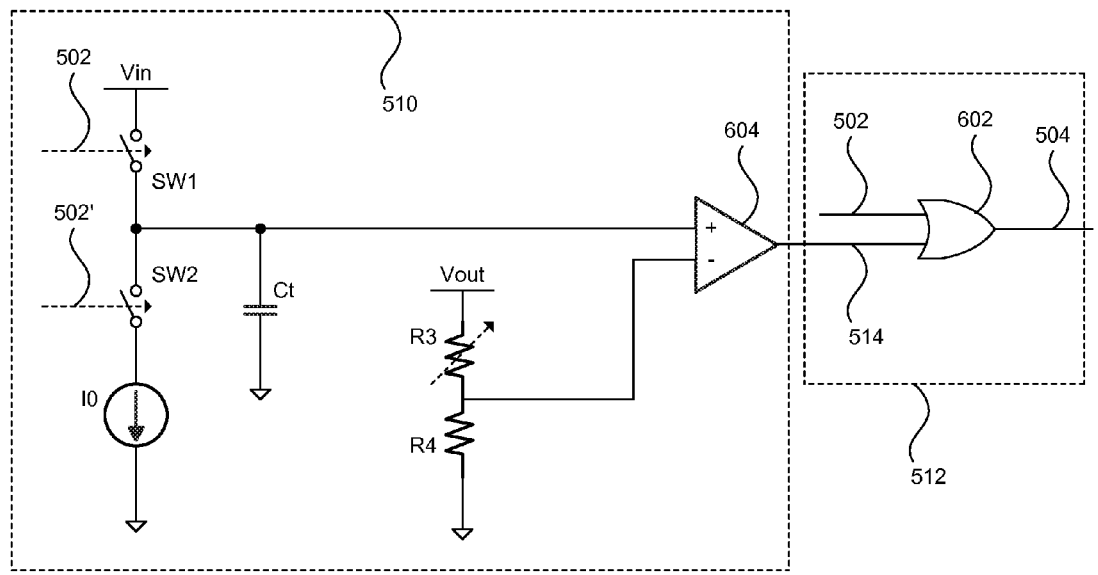
FIG. 6 is a circuit diagram showing more details of the control signal generator 500 (see FIG. 5).

FIG. 6 is a circuit diagram showing more details of the control signal generator 500 (see FIG. 5). The adaptive dead time generator 512 may be implemented with an OR gate 602. The analog timer 510 may be implemented with two switches SW1 and SW2, a current source I0, a capacitor Ct, resistors R3 and R4, and a comparator 604. The resistor R3 may be a variable resistor. The input control signal 502' (Pgate_origin_b) is the inverting signal of the input control signal 502 (Pgate_origin). The signals 502 and 502' control the switches SW1 and SW2.

In general, the difference between Vout and Vin determines the dead time. The dead time is inversely proportional to the difference: When the difference is relatively small, the dead time is relatively large, and when the difference is relatively large, the dead time is relatively small. More specifically, the adaptive dead time achieved by the control signal generator 500 is according to the following equation:

$$T_{dead\_real} = \frac{C_t}{I_0} \cdot \left(V_{in} - V_{out} \cdot \frac{R_4}{R_4 + R_3}\right)$$

In this equation, the voltage difference refers not only to the difference between the input voltage Vin and the output voltage Vout, but also to the difference as modified according to the various parameters. The parameters for Ct, I0, R3 and R4 may be selected in order for the circuit 500 to implement the curve of the line 302 (see FIG. 3). Alternatively, the parameters may be adjusted as desired to implement other ways of calculating the dead time.

Figure 7:
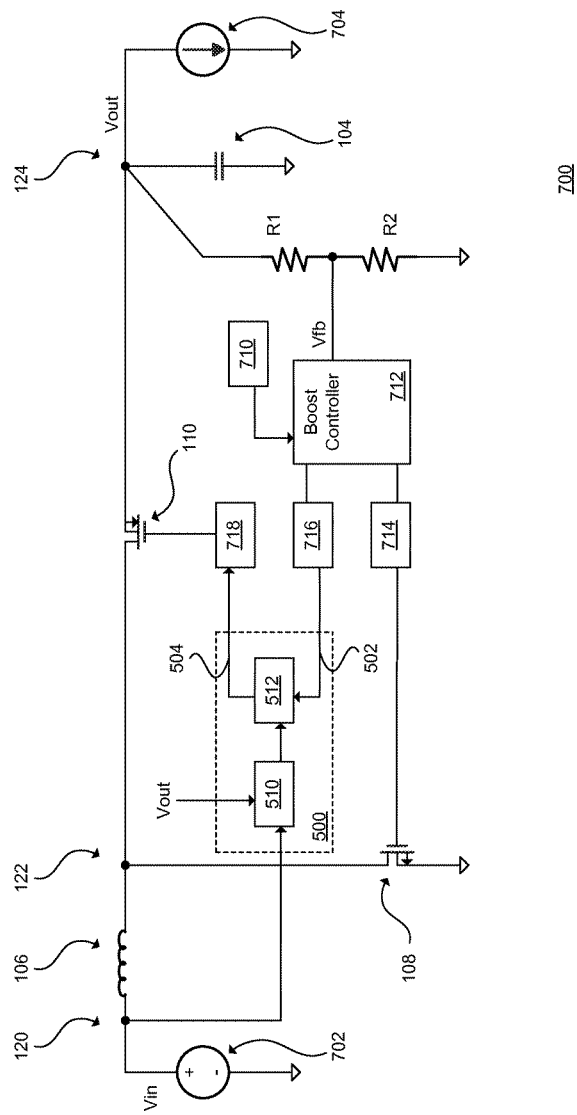
FIG. 7 is a block diagram of a boost regulator 700.

FIG. 7 is a block diagram of a boost regulator 700. The boost regulator 700 is similar to the boost regulator 100 (see FIG. 1), with similar components having similar reference numbers (e.g., the low side switch 108, the high side switch 110, etc.). The diode structure 130 (see FIG. 1) is a component of the high side switch 110 and is not shown. In general, FIG. 7 shows more details of the components that make up the boost mode regulator 112 (see FIG. 1).

The input node 120 connects to a battery 702 as the source, and the output node 124 connects to a load 704, represented as a current sink. The boost regulator 700 may be a component of, or connected to, an electronic device such as a mobile telephone, a portable computer, a tablet computer, etc. The boost regulator 700 includes the control signal generator 500 (see FIG. 5) and related components, resistors R1 and R2, a clock signal generator 710, a boost controller 712, a low side switch control logic and driver circuit 714, a high side switch control logic circuit 716, and a high side switch driver circuit 718.

The clock signal generator 710 generates a clock signal for the boost controller 712, for example to generate the clock signals for timing the commutation period, the duty cycle, the dead time, or the timing for turning the switches on and off, etc. The boost controller 712 receives a feedback voltage Vfb that is based on the output voltage Vout (note the connections to the resistors R1 and R2). The boost controller 712 uses the feedback voltage Vfb to generate control signals for the low side switch control logic and driver circuit 714 and the high side switch control logic circuit 716, for example to control the duty cycles for switching the switches 108 and 110. The low side switch control logic and driver circuit 714 controls the switching of the low side switch 108.

The high side switch control logic circuit 716 generates the Pgate_origin signal 502 for the control signal generator 500 (see FIG. 5). The analog timer 510 receives the input voltage Vin from the input node 120. The adaptive dead time generator 512 receives the Pgate_origin signal 502 and generates the Pgate_prolong signal 504 for the high side switch driver circuit 718. The high side switch driver circuit 718 controls the switching of the high side switch 110.

Figure 8:
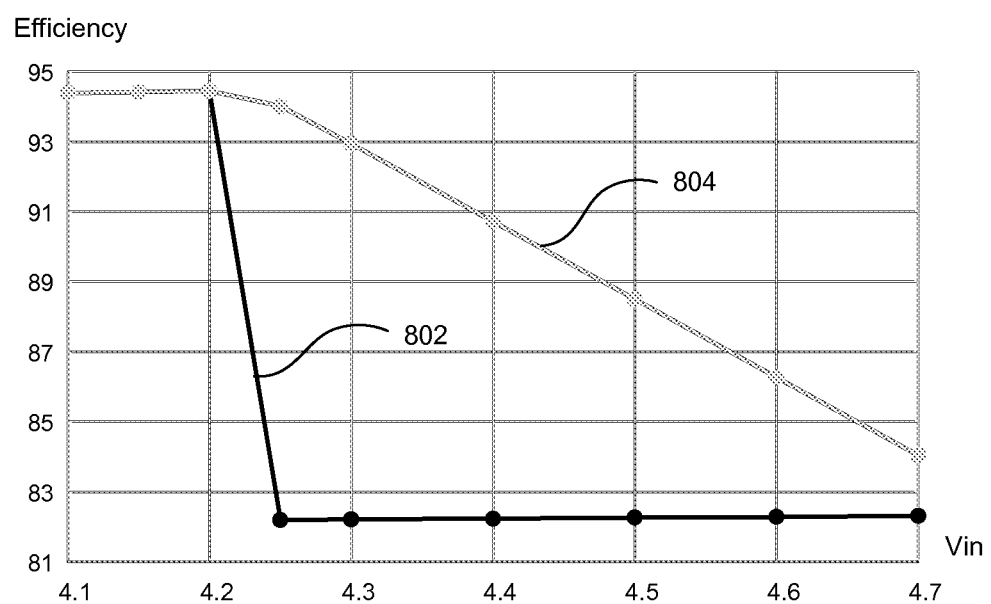
FIG. 8 is a graph showing the efficiency comparison between adaptive mode and asynchronous mode for a boost regulator.

FIG. 8 is a graph showing the efficiency comparison between adaptive mode and asynchronous mode for a boost regulator. For example, a boost regulator lacking adaptive mode would instead use asynchronous mode, resulting in the inefficiency discussed above (e.g., regarding FIG. 3). In FIG. 8, the x-axis is the input voltage Vin in volts, the output voltage Vout is fixed at 4.6 V, and the y-axis is the efficiency as a percentage. The line 802 shows the efficiency of asynchronous mode, and the line 804 shows the efficiency of adaptive mode. When the input voltage Vin is below about 4.2 V, the efficiencies are the same (around 94.5%). When the input voltage Vin is around 4.25 V, the efficiency difference is the largest, with adaptive mode (line 804) being around 94% efficient and asynchronous mode (line 802) being around 82% efficient. As the input voltage Vin increases, the efficiency of the adaptive mode (line 804) decreases, with the efficiencies becoming equal when the input voltage Vin is above about 4.7 V (off the right edge of the graph).

Figure 9:
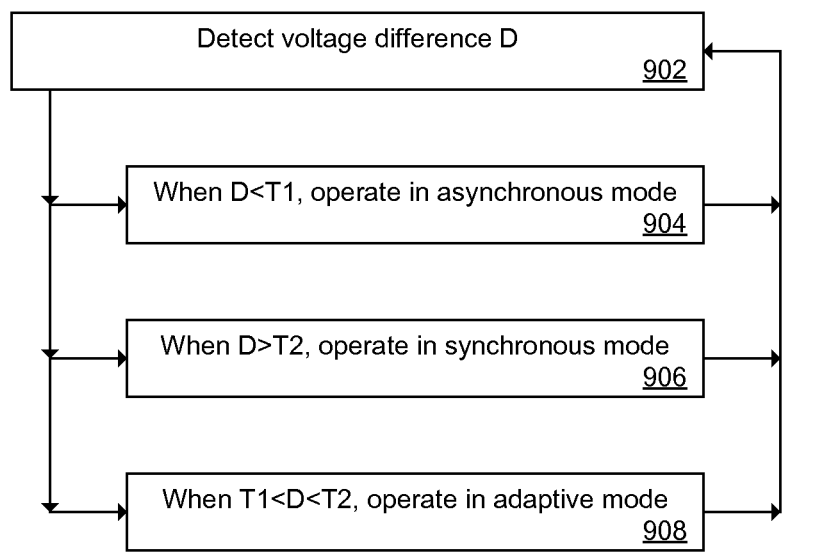
FIG. 9 is a flowchart of a method 900 of operating a boost regulator.

FIG. 9 is a flowchart of a method 900 of operating a boost regulator (e.g., the boost regulator 100 of FIG. 1). The boost regulator includes a low side switch and a high side switch (e.g., 108 and 110 in FIG. 1).

At 902, a voltage difference is detected between an input voltage and an output voltage of the boost regulator. For example, the boost regulator may detect the voltage difference using an analog timer (e.g., the analog timer 510 of FIG. 6). The voltage difference need not be a straight subtraction, but may also be an equation as discussed above. Depending upon the detected voltage difference, the method 900 proceeds to one of 904, 906 and 908. For example, the boost mode regulator 112 (see FIG. 1) may control the boost regulator to selectively operate according to 904, 906 or 908, for example by controlling the low side switch and the high side switch (e.g., 108 and 110 in FIG. 1).

At 904, when the voltage difference is below a first threshold, the boost regulator is operated in an asynchronous mode. For example, in FIG. 3, when the input voltage Vin is above V2, the voltage difference is below a first threshold. The voltage difference need not be a straight subtraction, but may also be an equation as discussed above. In asynchronous mode, the high side switch is controlled to not conduct, and the low side switch is switched according to a duty cycle.

At 906, when the voltage difference is above a second threshold, the boost regulator is operated in a synchronous mode. For example, in FIG. 3, when the input voltage Vin is below V1, the voltage difference is above a second threshold. The voltage difference need not be a straight subtraction, but may also be an equation as discussed above. In synchronous mode, the low side switch and the high side switch are controlled to operate such that the high side switch conducts when the low side switch does not conduct, and the high side switch does not conduct when the low side switch conducts.

At 908, when the voltage difference is between the first threshold and the second threshold, the boost regulator is operated in an adaptive mode. For example, in FIG. 3, when the input voltage Vin is between V1 and V2, the voltage difference is between the first threshold and the second threshold. In adaptive mode, an adaptive dead time is determined based on the voltage difference. The voltage difference need not be a straight subtraction, but may also be an equation as discussed above. The adaptive dead time changes as the voltage difference changes. When the low side switch switches from conducting to not conducting, the high side switch is controlled to switch from not conducting to conducting after the adaptive dead time. When the low side switch switches from not conducting to conducting, the high side switch is controlled to switch from conducting to not conducting after the adaptive dead time.

After 904, 906 or 908, the method 900 returns to 902 in order to continuously detect the voltage difference and to switch modes accordingly. Within the adaptive mode, as the method 900 is cycling between 902 and 908, the dead time is adaptively adjusted according to the voltage difference.

The method may further include switching the low side switch of the boost regulator according to a duty cycle. The duty cycle is adjustable, and the boost mode regulator increases the duty cycle to increase the output voltage. For example, the boost controller 712 (see FIG. 7) senses the output voltage Vout, and adjusts the duty cycle accordingly.

In summary, as discussed above, the adaptive mode improves the efficiency of the boost regulator, as compared to a boost regulator lacking the adaptive mode (see also FIG. 8). The adaptive mode allows the boost regulator to operate more selectively regarding the forward voltage drop on the diode structure 130 (see FIG. 1) in the high side switch 110. In addition, the adaptive mode smooths out the transition between synchronous mode and asynchronous mode, as otherwise the mode transition may create undesired overshoots or undershoots due to the sudden voltage change between the switching node 122 (see FIG. 1) and the output node 124. Finally, when the high side switch 110 is implemented with a PMOS transistor, and its body diode is used as the diode structure 130, a parasitic PNP bipolar junction transistor is turned on, injecting additional currents into the substrate, which hurts the efficiency and reliability; using the adaptive mode improves this.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A boost regulator, comprising:
   a low side switch coupled to a switching node;
   a high side switch coupled to the switching node and to an output node; and
   a boost mode regulator that controls the low side switch and the high side switch to selectively operate in one of an asynchronous mode, a synchronous mode, and an adaptive mode, wherein when a voltage difference between an input voltage and an output voltage of the boost regulator is between a first threshold and a second threshold, the boost regulator controls the low side switch and the high side switch to operate in the adaptive mode.

2. The boost regulator of claim 1, wherein the boost mode regulator switches the low side switch according to a duty cycle, wherein the duty cycle is adjustable, and wherein the boost mode regulator increases the duty cycle to increase an output voltage at the output node.

3. The boost regulator of claim 1, wherein in the synchronous mode, the boost mode regulator controls the low side switch and the high side switch to operate such that the high side switch conducts when the low side switch does not conduct, and the high side switch does not conduct when the low side switch conducts.

4. The boost regulator of claim 1, wherein in the asynchronous mode, the boost mode regulator controls the high side switch to not conduct, and the boost mode regulator switches the low side switch according to a duty cycle.

5. The boost regulator of claim 1,
wherein in the adaptive mode, the boost mode regulator controls the high side switch according to an adaptive dead time, wherein the adaptive dead time changes as the voltage difference between the input voltage and the output voltage changes,
wherein in the adaptive mode, when the low side switch switches from conducting to not conducting, the boost mode regulator controls the high side switch to switch from not conducting to conducting after the adaptive dead time, and
wherein in the adaptive mode, when the low side switch switches from not conducting to conducting, the boost mode regulator controls the high side switch to switch from conducting to not conducting after the adaptive dead time.

6. The boost regulator of claim 1, further comprising:
an inductor coupled to the switching node and to an input node.

7. The boost regulator of claim 1, further comprising:
an inductor coupled to the switching node and to an input node; and
a battery coupled to the input node.

8. The boost regulator of claim 1, further comprising:
an inductor coupled to the switching node and to an input node; and
a battery coupled to the input node,
wherein the high side switch has a diode drop voltage when the high side switch is not conducting, and
wherein the output voltage corresponds to a switching voltage at the switching node less the diode drop voltage when the high side switch is not conducting.

9. The boost regulator of claim 1, wherein the boost regulator is coupled to an input node, the boost regulator further comprising:
an analog timer that generates a comparison signal based on the input voltage and the output voltage; and
an adaptive dead time generator circuit that receives the comparison signal, and that generates a control signal to control the high side switch, wherein the control signal includes an adaptive dead time according to the comparison signal.

10. The boost regulator of claim 1, wherein when the voltage difference between the input voltage and the output voltage of the boost regulator is below a threshold, the boost regulator controls the low side switch and the high side switch to operate in the asynchronous mode.

11. The boost regulator of claim 1, wherein when the voltage difference between the input voltage and the output voltage of the boost regulator is above a third threshold, the boost regulator controls the low side switch and the high side switch to operate in the synchronous mode.

12. A method of operating a boost regulator, the method comprising:
detecting a voltage difference between an input voltage and an output voltage of the boost regulator;
when the voltage difference is below a first threshold, operating the boost regulator in an asynchronous mode;
when the voltage difference is above a second threshold, operating the boost regulator in a synchronous mode; and
when the voltage difference is between the first threshold and the second threshold, operating the boost regulator in an adaptive mode.

13. The method of claim 12, further comprising:
controlling a low side switch and a high side switch of the boost regulator to selectively operate in the asynchronous mode, the synchronous mode, and the adaptive mode.

14. The method of claim 12, further comprising:
switching a low side switch of the boost regulator according to a duty cycle, wherein the duty cycle is adjustable, and wherein the boost regulator increases the duty cycle to increase the output voltage.

15. The method of claim 12, wherein operating the boost regulator in the synchronous mode comprises:
controlling a low side switch and a high side switch to operate such that the high side switch conducts when the low side switch does not conduct, and the high side switch does not conduct when the low side switch conducts.

16. The method of claim 12, wherein operating the boost regulator in the asynchronous mode comprises:
controlling a high side switch to not conduct; and
switching a low side switch according to a duty cycle.

17. The method of claim 12, wherein operating the boost regulator in the adaptive mode comprises:
determining an adaptive dead time based on the voltage difference, wherein the adaptive dead time changes as the voltage difference changes;
when a low side switch switches from conducting to not conducting, controlling a high side switch to switch from not conducting to conducting after the adaptive dead time; and
when the low side switch switches from not conducting to conducting, controlling the high side switch to switch from conducting to not conducting after the adaptive dead time.

18. A boost regulator, comprising:
means for detecting a voltage difference between an input voltage and an output voltage of the boost regulator; and
means for selectively operating the boost regulator in one of an asynchronous mode, a synchronous mode, and an adaptive mode, according to the voltage difference;
wherein in the adaptive mode, the means for selectively operating the boost regulator determines an adaptive dead time based on the voltage difference, wherein the adaptive dead time changes as the voltage difference changes, and
when a low side switch switches from conducting to not conducting, the means for selectively operating the boost regulator controls a high side switch to switch from not conducting to conducting after the adaptive dead time, and
when the low side switch switches from not conducting to conducting, the means for selectively operating the boost regulator controls the high side switch to switch from conducting to not conducting after the adaptive dead time.

19. The boost regulator of claim 18, wherein in the synchronous mode, the means for selectively operating the boost regulator controls a low side switch and a high side switch to operate such that the high side switch conducts when the low side switch does not conduct, and the high side switch does not conduct when the low side switch conducts.

20. The boost regulator of claim 18, wherein in the asynchronous mode, the means for selectively operating the boost regulator controls a high side switch to not conduct, and the means for selectively operating the boost regulator switches a low side switch according to a duty cycle.

21. An electronic device, comprising:
a battery coupled to an input node;
an inductor coupled to the input node and to a switching node;
a load coupled to an output node; and
a boost regulator, including:
a low side switch coupled to the switching node,
a high side switch coupled to the switching node and to the output node, and
a boost mode regulator that controls the low side switch and the high side switch to selectively operate in one of an asynchronous mode, a synchronous mode, and an adaptive mode, wherein in the adaptive mode, the boost mode regulator controls the high side switch according to an adaptive dead time, wherein the adaptive dead time is based on a voltage of the battery.

22. The electronic device of claim 21, wherein the boost regulator begins in the asynchronous mode, transitions to the adaptive mode when the voltage of the battery falls below a first threshold, and transitions to the synchronous mode when the voltage of the battery falls below a second threshold.

23. The electronic device of claim 21, wherein the boost regulator begins in the synchronous mode, transitions to the adaptive mode when the voltage of the battery rises above a first threshold, and transitions to the asynchronous mode when the voltage of the battery rises above a second threshold.

24. The electronic device of claim 21, wherein the boost regulator begins in the asynchronous mode, transitions to the adaptive mode when a voltage of the load rises above a first threshold, and transitions to the synchronous mode when the voltage of the load rises above a second threshold.

25. The electronic device of claim 21, wherein the boost regulator begins in the synchronous mode, transitions to the adaptive mode when a voltage of the load falls below a first threshold, and transitions to the asynchronous mode when the voltage of the load falls below a second threshold.

26. The electronic device of claim 21, wherein the adaptive dead time decreases as the voltage of the battery decreases.

27. The electronic device of claim 21, wherein the adaptive dead time increases as the voltage of the battery increases.

28. The electronic device of claim 21, wherein the load has a load voltage,
wherein in the adaptive mode, the adaptive dead time changes as a voltage difference between the battery voltage and the load voltage changes,
wherein in the adaptive mode, when the low side switch switches from conducting to not conducting, the boost mode regulator controls the high side switch to switch from not conducting to conducting after the adaptive dead time, and
wherein in the adaptive mode, when the low side switch switches from not conducting to conducting, the boost mode regulator controls the high side switch to switch from conducting to not conducting after the adaptive dead time.

\* \* \* \* \*